UNITED STATES PATENT OFFICE.

RUSSELL WILLIAM MUMFORD, OF NEW YORK, N. Y., ASSIGNOR TO REFINING PRODUCTS CORPORATION, OF WILMINGTON, DELAWARE, A CORPORATION OF DELAWARE.

MANUFACTURE OF MILK-SUGAR.

1,366,822.  Specification of Letters Patent.  Patented Jan. 25, 1921.

No Drawing.  Application filed July 2, 1917. Serial No. 178,294.

*To all whom it may concern:*

Be it known that I, RUSSELL WILLIAM MUMFORD, a citizen of the United States, residing at New York, in the county of New York and State of New York, have invented certain new and useful Improvements in Manufacture of Milk-Sugar, of which the following is a specification.

This invention relates to the manufacture of milk sugar; and it comprises a process of making high grade milk sugar wherein whey, made from milk by addition of rennet or acid, is clarified or purified as effectively as possible, is then mixed with a small proportion of a decolorizing carbon or vegetable black prepared by slow carbonization of vegetable matter in such a manner as to give a granular open-textured open-pored material, such whey being thereafter separated from the vegetable black, concentrated and crystallized; all as more fully hereinafter set forth and as claimed.

Milk sugar is made from the whey resulting from the treatment of milk with acids or rennet to precipitate the casein; the whey being the liquid remaining after the separation of the coagulum. This whey contains on an average from 4.5 to 5 per cent. of milk sugar, some proteids, ash and, generally, a small amount of fat.

In practice it is highly desirable to separate the impurities and residual fat for the sake of the refined white milk sugar. If these impurities are not effectually removed, the sugar is apt to become yellow and discolored and acquire odor on standing. In the ordinary process of manufacture the whey is heated to about 160° to 185° F. and then neutralized; neutralization being usually with a little lime. The neutralized liquid is then boiled. This treatment coagulates albuminoids and impurities, and, in part, removes other suspended impurities with the coagulum. The liquid is filtered and is then evaporated *in vacuo* to make crystallized milk sugar or lactose.

This product, however, still contains some impurities and has a brown or yellow color. It is the custom to redissolve this crude brown milk sugar, purify the solution and then send it through boneblack to remove the color.

In the above described treatment of the whey there is no complete removal of the non-sugar impurities; there is at best merely a partial removal. And I have found that by treating the purified whey with certain types of vegetable blacks or decolorizing carbons I can produce a pure article of milk sugar with fewer and simpler operations than those used in the present art, in that I can omit the final boneblack treatment and re-crystallization.

I have found that by treating a purified whey with a small percentage of vegetable black, the non-sugar impurities, and particularly the coloring matters are taken up. By now filter pressing the mixture, I obtain a decolorized milk sugar syrup which can be directly evaporated and crystallized to make a permanent white milk sugar. I find it is however much better to use a particular type of vegetable carbon or decolorant, since this superadds other functions to the decolorizing function just stated; these other functions being even more important.

This decolorant I produce by a special method of charring vegetable matters, such as peat or sawdust, as more fully set forth in my copending application, Serial No. 167,971. Briefly stated, the method as disclosed in the said application in an advantageous embodiment, is to treat peat or sawdust or other vegetable matter with a highly colloid material, like starch, in the event that such vegetable material does not already contain a sufficient amount of colloid materials. The vegetable material in a granulated form is then mixed with grains of a material such as dolomite, adapted to act as a spacing agent and also to evolve carbon dioxid or other purifying gas continuously throughout a wide temperature range. The mixture is then slowly heated in a vented retort. Under the action of the heat, the moisture is first expelled, taking with it various volatile matters and puffing up the vegetable material and rendering it porous. Then the material chars slightly, giving off various vapors and gases. Because of the presence of the mineral spacing agent, these vapors and gases are afforded an opportunity to escape without in their turn undergoing decomposition in the presence of the grains of vegetable matter. As the charring goes on the dolomite begins to evolve carbon dioxid at a temperature somewhere around 250° C. This carbon dioxid is taken up in the pores of the charring mass and as the temperature goes up, it exercises a beneficial action on these pores, probably by opening them up. The temperature is then carried to a high point and the material is dumped into water and washed. The ultimate material is a granular carbon having open pores representing, more or less closely, the cellular structure of the original material before carbonization. It is vastly more open-textured than charcoal in which, in the usual methods of making charcoal, the pores are closed and sealed by the deposition of carbon in them. When wood is first charred in making charcoal, the vapors and gases accumulate in the pores where they are in turn carbonized, depositing carbon and closing the pores. This is desirable in making charcoal where a hard, dense product is wanted. In the present material, the effort is to have open pores.

This material unites a number of properties. It has a large surface area of a form of carbon which is very active in adsorbing or removing coloring matters from solution; being unusually active in this way.

In addition, this material has the property possessed by kieselguhr and some other highly porous mineral matters, of collecting or flocculating suspended solids. In other words, this particular material unites the property of decolorizing with that of removing suspended solids.

When this material is mixed with purified whey it not only decolorizes in the manner before stated, and in particularly energetic fashion, but it also tends to attract or flocculate suspended impurities. In the whey much of the impurity is present in a more or less colloidal form; in a form which is between a true solution and a suspension. The matters in suspension or quasi-solution are very effectively attracted by this decolorant. The decolorant not only removes the color of the solution, but it also collects and removes the suspended impurities; and among them the minute globules of fat.

As a rule I mix from 2 to 15 per cent. of my decolorant (calculated on the weight of the liquid) into the whey solution, the solution being well stirred or otherwise agitated, for instance by the use of an air blast. Ten to fifteen minutes under constant agitation should be usually allowed for the action of the decolorant, the whey solution being kept under temperature conditions usual in the manufacture of the product.

I wish it to be understood that no acidifying of the milk sugar solution prior to mixing my decolorant with it is necessary, and no particular degree of heating or boiling of the solution is required. My decolorant acts on neutral and cold solutions, but slight acidification and heat may be used if preferred in the process of manufacture.

After treatment with the decolorant for from 10 to 15 minutes, the solution with the decolorant is sent through filter presses. The decolorant is held back in the press as press cake, and the filtered milk sugar solution which flows from the press will be found to be bright, sparkling and water-white, practically all of its color and a large part of the suspended and dissolved mineral impurities and other impurities having been removed by the action of the decolorant. This solution is then further concentrated, sent directly to the vacuum pan and boiled into a refined, crystalline milk sugar.

The decolorant cakes in the press are washed with water, or sweetened off; the resulting sweet water is very light in color and can be turned back into the process. The washed press cakes are treated with a dilute solution of caustic soda and with dilute acid or with dilute acid alone, and are again thoroughly washed with clear, hot water. The carbon can then be used again.

While I have described above the use of the vegetable carbon directly on the clarified and unconcentrated whey, that is, the material obtained after the first clarification, it may be used with equal advantage with various more or less concentrated liquids produced during the operation of making milk sugar. There are some advantages in treating these partially concentrated liquids in this manner. The process may also be applied to milk sugar solutions in the refining of raw milk sugar.

In treating solutions obtained by dissolving raw milk sugar, I add from 2 to 15 per cent. of the vegetable carbon to the dissolved raw milk sugar solution and allow the two to remain mixed and in contact from 10 to 15 minutes; the solution being well stirred or otherwise mechanically agitated. The carbon is separated by filter press or other means from the solution, which will be found to be sparkling, bright and water-white; ready for evaporation and crystallization into first class white milk sugar.

As I have just described it, there is but a single treatment with the vegetable carbon, but the carbon may be advantageously applied in small quantities at two stages in the manufacture of milk sugar, namely after having been applied to the clarified whey solution as above described, or after having been applied to the redissolved raw milk sugar solution as hereinbefore stated. The liquids may be somewhat concentrated and once more treated with carbon in small quantities and for a short time. The treatment may be applied to thick syrup prior to crystallization. With this treatment, any slight cloudiness there may be in the concentrated or thick solution may be entirely removed.

In an alternative method, I may mix the carbon with the clarified whey and, without filtering, proceed to concentrate. The carbon may remain with the whey during most of the period of evaporation. I finally filter the thick or syrupy material prior to crystallization.

While I have hereinbefore stated that any of the more efficient vegetable or decolorizing carbons now on the market may be used in the present process, I find, as a matter of fact, that the use of the particular carbon described *ante* gives results which are very much better, there being a difference in kind as well as in degree.

What I claim is:—

1. In the manufacture of lactose or milk sugar, the process which comprises mixing the clarified and neutralized whey with an open-textured granular vegetable carbon having open pores representing approximately the cellular structure of the original vegetable material from which it was made, agitating the mixture, separating the carbon and evaporating the resultant purified liquid to crystallization.

2. The process of making milk sugar which comprises producing concentrated liquids containing milk sugar, mingling with an open-textured granular vegetable carbon having open pores representing approximately the cellular structure of the original vegetable material and agitating, separating the carbon and evaporating to crystallization.

3. In the manufacture of milk sugar from clarified and purified whey by evaporation to crystallization, the process which comprises mingling the solution with an open-textured granular vegetable carbon having open pores representing approximately the cellular structure of the original vegetable material at one or more stages in the operation and separating the carbon.

4. In the manufacture of milk sugar from clarified and purified whey by evaporation to crystallization, the process which comprises maintaining the liquid in contact with an open-textured granular vegetable carbon having open pores representing approximately the cellular structure of the original vegetable material for a time during the operation.

5. In the manufacture of pure milk sugar from impure solutions of the same, the process which comprises maintaining such a solution in contact with an open-textured granular vegetable carbon having open pores representing approximately the cellular structure of the original vegetable material for a time, separating the carbon and then evaporating to crystallization.

In testimony whereof, I affix my signature hereto.

RUSSELL WILLIAM MUMFORD.